US012012316B2

(12) United States Patent
Nishikawa

(10) Patent No.: US 12,012,316 B2
(45) Date of Patent: Jun. 18, 2024

(54) WINDING MACHINE AND METHOD OF CONTROLLING DRIVING OF WINDING MACHINE

(71) Applicant: Kito Corporation, Yamanashi (JP)

(72) Inventor: Kazuhiro Nishikawa, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 239 days.

(21) Appl. No.: 17/770,054

(22) PCT Filed: Sep. 10, 2020

(86) PCT No.: PCT/JP2020/034316
§ 371 (c)(1),
(2) Date: Apr. 19, 2022

(87) PCT Pub. No.: WO2021/079642
PCT Pub. Date: Apr. 29, 2021

(65) Prior Publication Data

US 2022/0396457 A1 Dec. 15, 2022

(30) Foreign Application Priority Data

Oct. 21, 2019 (JP) ................................ 2019-192225

(51) Int. Cl.
*B66D 3/20* (2006.01)

(52) U.S. Cl.
CPC .......... *B66D 3/20* (2013.01); *B66D 2700/025* (2013.01)

(58) Field of Classification Search
CPC ... B66D 3/20; B66D 3/24; B66D 1/12; B66D 1/46; B66D 1/485; B66D 2700/025
See application file for complete search history.

(56) References Cited

U.S. PATENT DOCUMENTS 5,865,426 A * 2/1999 Kazerooni ................ B66C 1/62 254/270
6,073,496 A * 6/2000 Kuhn ..................... G01G 19/14 73/862.56

(Continued)

FOREIGN PATENT DOCUMENTS

CN 2423264 Y 3/2001
CN 202880741 U 4/2013

(Continued)

OTHER PUBLICATIONS

Office Action issued on Nov. 16, 2023, in corresponding Chinese patent Application No. 202080085996.4, 14 pages.

(Continued)

*Primary Examiner* — Emmanuel M Marcelo
(74) *Attorney, Agent, or Firm* — XSENSUS LLP

(57) ABSTRACT

A winding machine wherein a motor control means is able to control driving of a drive motor in a balancer mode, and the balancer mode includes a first balancer mode in which driving of the drive motor is controlled based on a first torque command value with an assist torque that assists the operating force added thereto, and a second balancer mode in which driving of the drive motor is controlled based on a second torque command value that does not assist the operating force, and a lifting/lowering position range is set to a first position range where control is performed in the first balancer mode regardless of the direction of the operating force being in either the winding up or winding down direction, and a second position range where control is performed to select whether control is performed in the first balancer mode or in the second balancer mode.

16 Claims, 8 Drawing Sheets

(56) References Cited

U.S. PATENT DOCUMENTS

| | | | | | |
|---|---|---|---|---|---|
| 6,547,220 | B2 * | 4/2003 | Johnson | B66D 1/485 254/331 |
| 6,554,252 | B2 * | 4/2003 | Kazerooni | B66D 3/18 212/331 |
| 6,595,493 | B2 * | 7/2003 | Krebs | G08C 23/04 254/266 |
| 6,634,621 | B2 * | 10/2003 | Keith | B66C 23/022 254/270 |
| 7,070,061 | B1 * | 7/2006 | Munnekehoff | B66D 3/18 212/328 |
| 7,222,839 | B2 * | 5/2007 | Taylor | B66D 1/485 254/270 |
| 7,559,533 | B2 * | 7/2009 | Stockmaster | B66D 3/18 254/270 |
| 9,273,508 | B2 * | 3/2016 | Manaras | E06B 9/88 |
| 9,824,841 | B2 * | 11/2017 | Tsang | G08B 21/187 |
| 10,457,527 | B2 * | 10/2019 | Johansson | B66C 13/18 |
| 11,208,305 | B2 * | 12/2021 | Kerovuori | B66D 1/46 |
| 11,377,330 | B2 * | 7/2022 | Jackson | B66D 1/28 |
| 2003/0025110 | A1 * | 2/2003 | Keith | B66C 23/022 254/334 |
| 2004/0155004 | A1 * | 8/2004 | Laundry | B66D 3/18 212/330 |
| 2013/0282178 | A1 * | 10/2013 | Freitag | B25J 13/02 700/257 |
| 2019/0256328 | A1 | 8/2019 | Ogawa et al. | |
| 2019/0337778 | A1 | 11/2019 | G et al. | |
| 2020/0017340 | A1 * | 1/2020 | Fuehrle | B66D 1/46 |

FOREIGN PATENT DOCUMENTS

| | | | | | |
|---|---|---|---|---|---|
| CN | 103663228 | A | | 3/2014 | |
| CN | 105947911 | A | | 9/2016 | |
| CN | 108946547 | A | | 12/2018 | |
| CN | 109715547 | A | | 5/2019 | |
| CN | 110316661 | A | | 10/2019 | |
| DE | 102012103515 | A1 | * | 10/2013 | B25J 13/02 |
| JP | S48-77552 | A | | 10/1973 | |
| JP | 51-27259 | A | | 3/1976 | |
| JP | 54-34980 | B2 | | 10/1979 | |
| JP | H01-197300 | A | | 8/1989 | |
| JP | 8-29920 | B2 | | 3/1996 | |
| JP | 2019-52007 | A | | 4/2019 | |
| JP | 2019-119550 | A | | 7/2019 | |
| KR | 20210088972 | A | * | 7/2021 | B66D 3/24 |

OTHER PUBLICATIONS

International Search Report and Written Opinion mailed on Nov. 10, 2020, received for PCT Application PCT/JP2020/034316, Filed on Sep. 10, 2020, 8 pages including English Translation.

* cited by examiner

WINDING MACHINE AND METHOD OF CONTROLLING DRIVING OF WINDING MACHINE

CROSS REFERENCE TO RELATED APPLICATIONS

This is a U.S. national stage of application No. PCT/JP2020/034316, filed on Sep. 10, 2020. Priority under 35 U.S.C.§ 119(a) and 35 U.S.C.§ 365(b) is claimed from Japanese Patent Applications No. 2019-192225 filed on Oct. 21, 2019. The entire disclosure and contents of each of the foregoing applications is incorporated herein by reference.

TECHNICAL FIELD

The present invention relates to a winding machine and a method of controlling driving of the winding machine.

BACKGROUND ART

In general, a winding machine lifts and lowers a load by hanging the load on a hook and operating an operation switch or the like. In contrast to this, among the winding machines, there is one that allows an operator to lift and lower a heavy load by applying a small amount of force to the load while putting his/her hands on the load without operating an operation switch, as if easily lifting and lowering the heavy load with his/her own hands. As such a winding machine, for example, there is one described in Patent Literature 1.

In Patent Literature 1, when a control unit detects that the sum of the weights of locking members and cargoes is added to a weight detection unit and controls a motor unit to balance the cargoes, the control unit limits the fed length of the locking members to equal to or less than a first length that can be preset variably. This prevents the cargo from colliding with a floor even when a sudden external force is applied.

CITATION LIST

Patent Literature

{PTL 1} JP 2019-052007

SUMMARY OF INVENTION

Technical Problem

By the way, in the configuration described in Patent Literature 1, when the cargo is positioned at a lower position that exceeds a first length L1, the cargo is lifted to fit in the first length L1. However, Patent Literature 1 does not disclose at all how to specifically limit the lower limit position of the cargo in the control unit that controls the motor unit to balance the cargoes.

The present invention has been made in consideration of the above-described circumstances, and an object thereof is to provide a winding machine and a method of controlling the winding machine that is capable of maintaining a balanced state and performing an assist according to an operating force in a balancer mode and at the same time, capable of regulating the directions of winding up and winding down without interrupting a torque control of a drive motor at a balancer upper limit position and a balancer lower limit position.

Solution to Problem

In order to solve the above-described problem, according to a first aspect, there is provided a winding machine being a winding machine that lifts and lowers a load by winding up and winding down a load chain or a rope from a winding machine main body, the winding machine including: a winding means that is arranged in the winding machine main body, on which the load chain or the rope is hung, and that winds up and winds down the load chain or the rope according to rotation; a drive motor that generates a driving force to rotate the winding means; a motor control means that controls driving of the drive motor; and a load detection means that detects a load torque applied to the winding means by the load chain or the rope hanging the load and an operating force with which an operator operates the load in winding up and winding down directions, in which the motor control means is able to control driving of the drive motor in a balancer mode in which a torque control is performed based on the load torque, and the balancer mode includes a first balancer mode in which driving of the drive motor is controlled based on a first torque command value with an assist torque that assists the operating force added thereto, and a second balancer mode in which driving of the drive motor is controlled based on a second torque command value that does not assist the operating force, and a lifting/lowering position range is set to a first position range where control is performed in the first balancer mode regardless of the direction of the operating force being in either the winding up or winding down direction, and a second position range where control is performed to select whether control is performed in the first balancer mode or in the second balancer mode, according to the direction of the operating force being in the winding up or winding down direction.

Further, in the above-described invention, preferably, the first position range is set to a balance position range between a balancer upper limit position and a balancer lower limit position in the balancer mode, and the second position range is set to a position range that is equal to or higher than the balancer upper limit position and/or a position range that is equal to or lower than the balancer lower limit position.

Further, in the above-described invention, preferably, a load torque applied to the winding means is set and registered based on a load of a winding target to be raised by the winding means, and the first torque command value in the first balancer mode is set to a torque command value obtained by adding an assist torque that assists the operating force to the set and registered load torque, and the second torque command value in the second balancer mode is set to a torque command value with a cancel torque that cancels the operating force from the set and registered load torque added thereto.

Further, in the above-described invention, preferably, the motor control means is able to set the balancer upper limit position and the balancer lower limit position to arbitrary height positions.

Further, in the above-described invention, preferably, the winding machine includes an operation device that includes an operation mode changeover switch and an operation means and drives the drive motor according to an operation of the operation means, in which the motor control means is able to switch between the balancer mode and a switch operation mode according to a switch operation of the operation mode changeover switch, and in the switch operation mode, the motor control means controls driving of the drive motor based on an operation of the operation means.

Further, in the above-described invention, preferably, the drive motor is a servo motor including an encoder, the motor control means includes a control unit that outputs a command value relating to control and a servo driver that supplies power controlled based on the command value to the drive motor, a switching means includes a sliding means that slides within a slidable slide range, and the motor control means performs a speed control to control the speed of the drive motor according to a sliding amount of the sliding means.

Further, according to a second aspect of the present invention, there is provided a method of controlling driving of a winding machine being a method of controlling driving of a winding machine that lifts and lowers a load by winding up and winding down a load chain or a rope from a winding machine main body, in which the winding machine includes: a winding means that is arranged in the winding machine main body, on which the load chain or the rope is hung, and that winds up and winds down the load chain or the rope according to rotation; a drive motor that generates a driving force to rotate the winding means; a motor control means that controls driving of the drive motor; a load detection means that detects a load torque applied to the winding means by the load chain or the rope hanging the load and an operating force with which an operator operates the load in winding up and winding down directions; and an operation device that includes a switching means and drives the drive motor according to a switch operation of the switching means, the method including: a load torque detection step that detects a load torque by the load detection means; and a torque control step that controls driving of the drive motor by the motor control means in a lifting/lowering position range set beforehand based on the load torque detected in the load torque detection step, in which in the torque control step, driving of the drive motor is able to be controlled in a balancer mode in which a torque control is performed based on the load torque, and the balancer mode includes a first balancer mode in which driving of the drive motor is controlled based on a first torque command value with an assist torque that assists the operating force added thereto, and a second balancer mode in which driving of the drive motor is controlled based on a second torque command value that does not assist the operating force, and the lifting/lowering position range includes a first position range where control is performed in the first balancer mode regardless of the direction of the operating force being in either the winding up or winding down direction, and a second position range where control is performed to select whether control is performed in the first balancer mode or in the second balancer mode, according to the direction of the operating force being in the winding up or winding down direction.

Advantageous Effects of Invention

According to the present invention, it becomes possible to maintain a balanced state and perform an assist according to an operating force in a balancer mode and at the same time, regulate the directions of winding up and winding down without interrupting a torque control of a drive motor at a balancer upper limit position and/or a balancer lower limit position.

DESCRIPTION OF EMBODIMENTS

There will be explained a winding machine 10 and a method of controlling driving of the winding machine 10 according to one embodiment of the present invention based on the drawings below.

<1. Regarding the Configuration of the Winding Machine 10>

Figure 1:
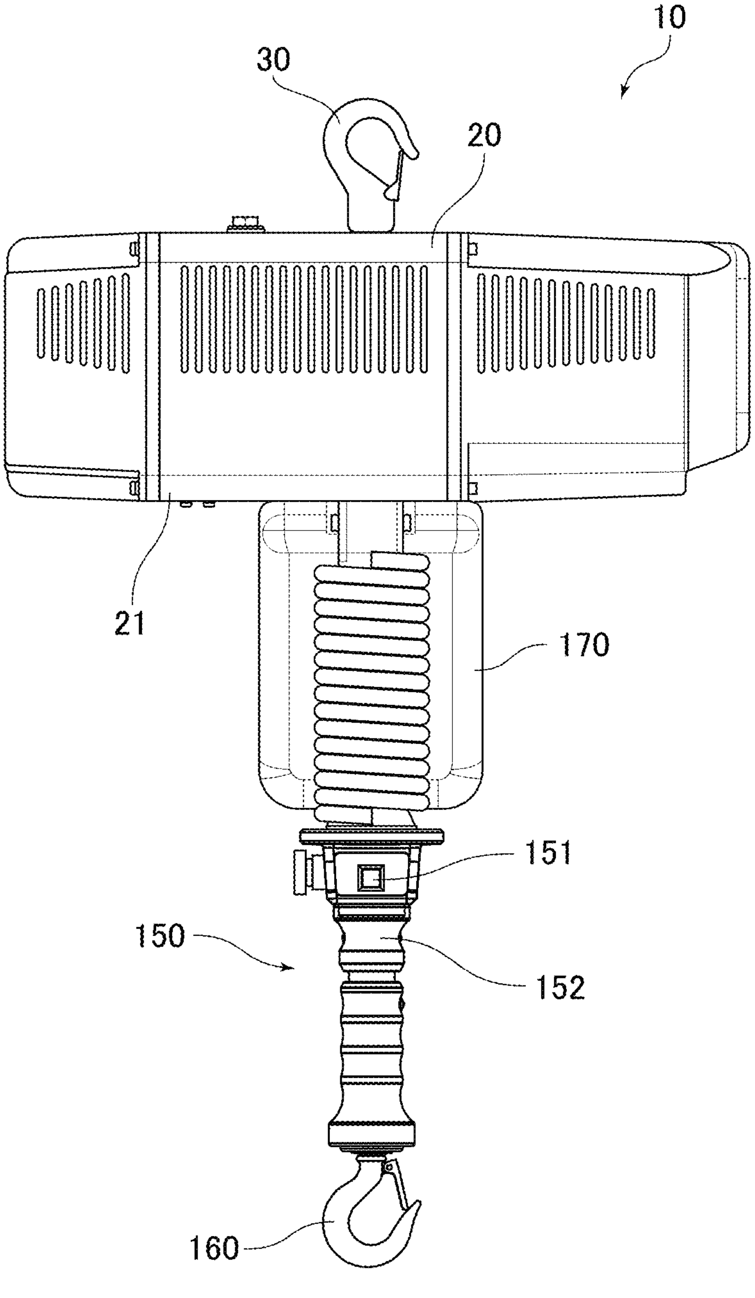
FIG. 1 is a perspective view illustrating an entire configuration of a winding machine according to one embodiment of the present invention.
Figure 2:
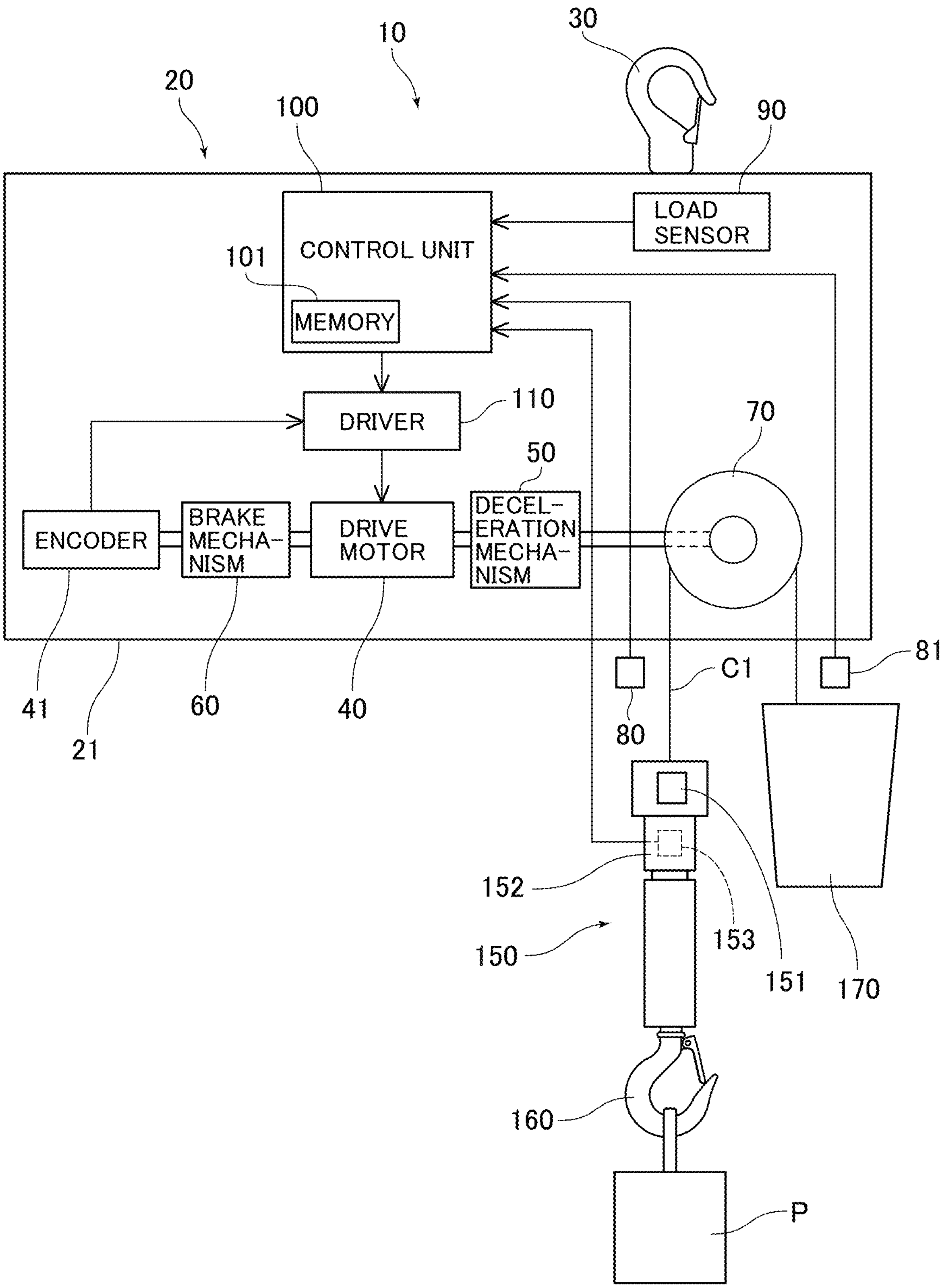
FIG. 2 is a view illustrating a control configuration of the winding machine illustrated in FIG. 1.

FIG. 1 is a perspective view illustrating an entire configuration of the winding machine 10. FIG. 2 is a view illustrating a control configuration of the winding machine 10. As illustrated in FIG. 1, the winding machine 10 includes a winding machine main body unit 20, an upper hook 30, a cylindrical operation device 150, and a chain bucket 170 holding a wound-up load chain C1 as main components.

The winding machine main body unit 20 can be suspended from a predetermined portion such as a ceiling via the upper hook 30. This winding machine main body unit 20 contains various components inside a housing 21. Specifically, inside the housing 21, there are provided a drive motor 40, a deceleration mechanism 50, a brake mechanism 60, a load sheave 70 that winds up the load chain C1, an upper-limit limit switch 80, a lower-limit limit switch 81, a load sensor 90, a control unit 100, and a driver 110. Incidentally, instead of the load chain C1 and the load sheave 70, a winding machine main body including a rope and a winding drum, which are not illustrated, can be provided. In this case, the chain bucket 170 is no longer required because the wound rope is held by the winding drum. Incidentally, the load sheave 70 and the winding drum correspond to a winding means.

The drive motor 40 is a motor that provides a driving force to drive the load sheave 70. In this embodiment, the drive motor 40 is a servo motor including a detector (encoder 41) for detecting a position (rotational position of a not-illustrated rotor), which is preferred to be an AC servo motor. Incidentally, as the AC servo motor, a synchronous motor is preferred, but an induction type motor is also acceptable.

Further, the deceleration mechanism 50 is a part that decelerates the rotation of the drive motor 40 and transmits the rotation to the load sheave 70 side. Further, the brake mechanism 60 is a part that generates a brake force to hold a load P even in a state where the drive motor 40 is not operating, although it is a part that can release the brake force by electromagnetic force when the drive motor 40 is operating.

The load sheave 70 is a part that winds up and winds down the load chain C1, and includes a plurality of chain pockets into which metal rings of the load chain C1 enter provided along its periphery.

The upper-limit limit switch 80 is a switch for detecting a limit position (upper limit position set mechanically and structurally) in winding up the load chain C1. Further, the lower-limit limit switch 81 is a switch for detecting a limit position (lower limit position set mechanically and structurally) in winding down the load chain C1.

The load sensor 90 is a load sensor that measures a loading load applied to the upper hook 30. In other words, the load sensor 90 is a sensor that measures and detects the total loading load of the loading load of the winding machine main body unit 20, the loading load of the load chain C1 (the portion that has not landed on a floor or the like), and the loading load of the load P. By subtracting the main body's own weight and so on from the total loading load measured and detected using this load sensor 90, the loading load applied to the load sheave 70 via the load chain C1 can be detected (calculated). The load sensor 90 is attached, for example, to an attachment shaft for attaching the upper hook 30 to the winding machine main body unit 20.

Incidentally, as the load sensor 90, a load cell including a strain gauge can be used. The position where the load sensor 90 is arranged may be, besides the above, any position as long as it is a position where the load applied to the load sheave 70 by the load chain C1 hanging the load P can be detected and measured, such as a position between the upper hook 30 and a crane trolley, between a lower hook 160 and the load P, or between a terminal of the load chain C1 and the lower hook 160. Further, as the load sensor 90, besides the load cell, a crane scale or the like can be used, but it is required to have accuracy and responsiveness that can be used for balancer control. The load sensor 90 and a partial function of the control unit 100 that calculates a load torque applied to the load sheave 70 from signals from the load sensor 90 correspond to a load detection means.

The control unit 100 is a part that gives the driver 110 command values of a control mode (speed control mode, torque control mode), position, speed, torque, and so on. This control unit 100 and the driver 110 correspond to a motor control means. Examples of the control unit 100 include a computer including a CPU (Central Processing Unit), a memory 101 (RAM (Random Access Memory), ROM (Read Only Memory), internal storage, external memory device, and so on), an input/output interface, and so on. In the memory 101, there is stored a control program for performing operations in a switch operation mode and a balancer mode to be described later.

Further, the driver 110 is a part that controls a power source supplied from the outside to an appropriate power based on a current value of the drive motor 40, output of the encoder 41, a command value for controlling motor driving given by the control unit 100, or the like, and supplies the power to the drive motor 40 to rotate the drive motor 40. Incidentally, in this embodiment, the drive motor 40 is a servo motor, and thus, the driver 110 is a servo driver, has at least a speed control mode and a torque control mode, and is configured to selectively execute the speed control or torque control based on a command from the control unit 100.

Figure 3:
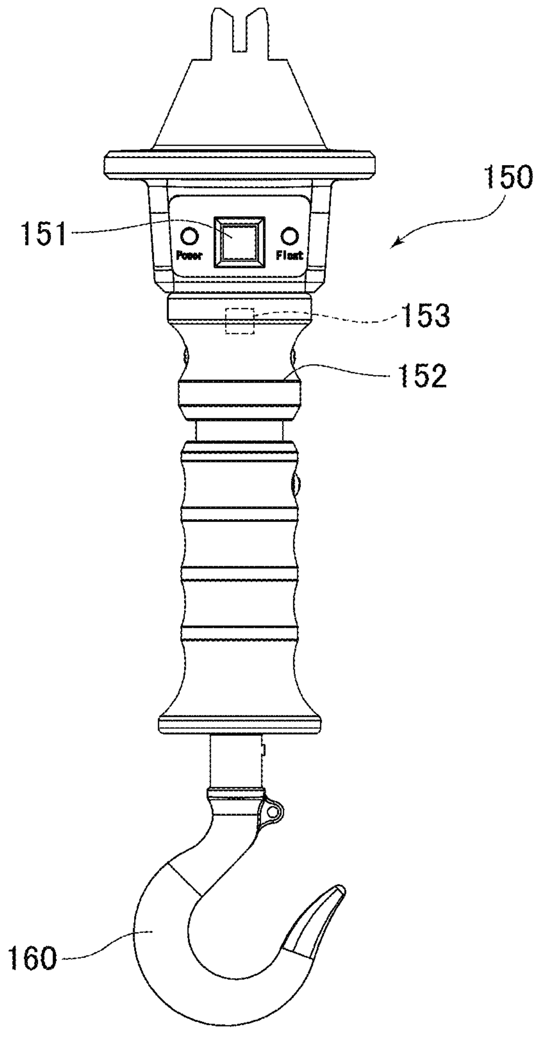
FIG. 3 is a view illustrating a configuration of a cylindrical operation device of the winding machine illustrated in FIG. 1.
Figure 4:
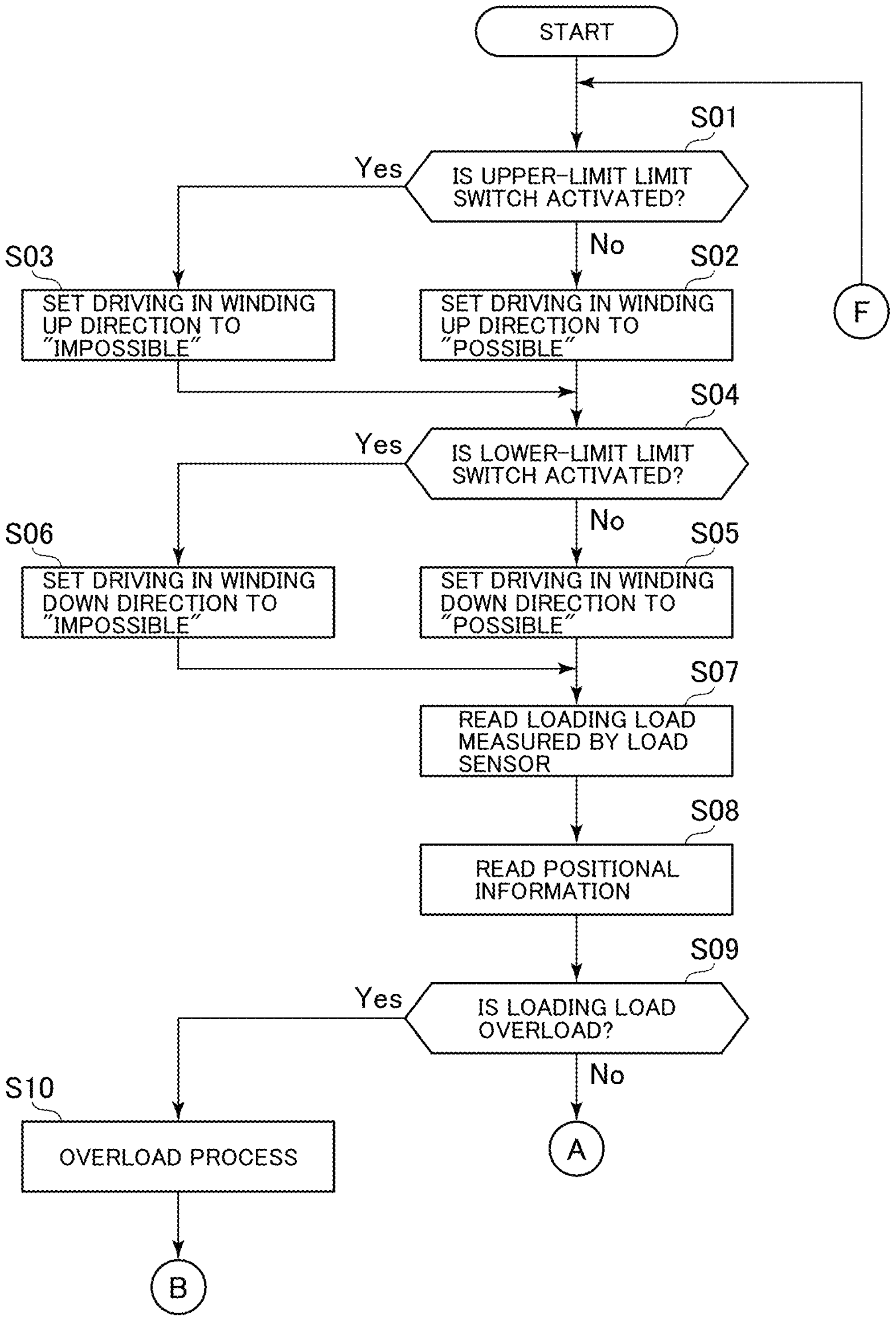
FIG. 4 is a view illustrating a part of a control flow of the winding machine illustrated in FIG. 1, and is a view illustrating Step S01 to Step S10.
Figure 5:
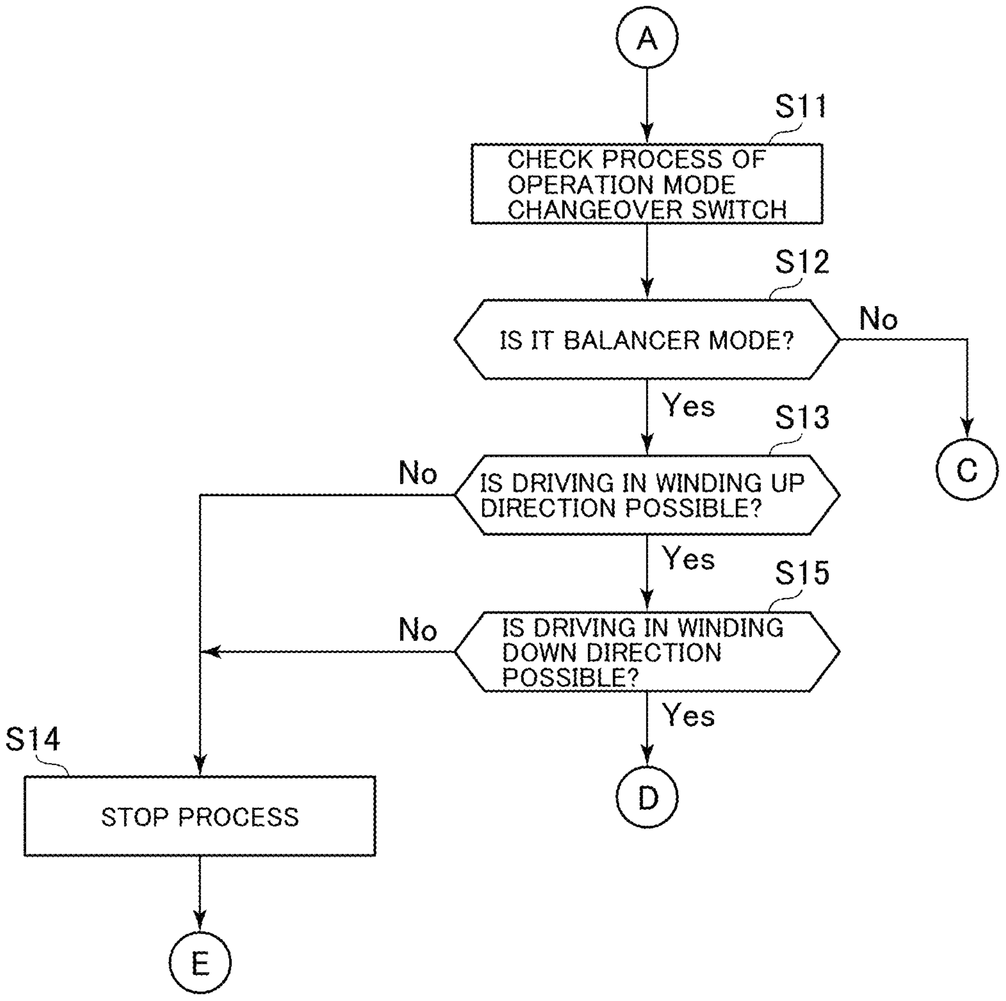
FIG. 5 is a view illustrating a part of the control flow of the winding machine illustrated in FIG. 1, and is a view illustrating Step S11 to Step S15.
Figure 6:
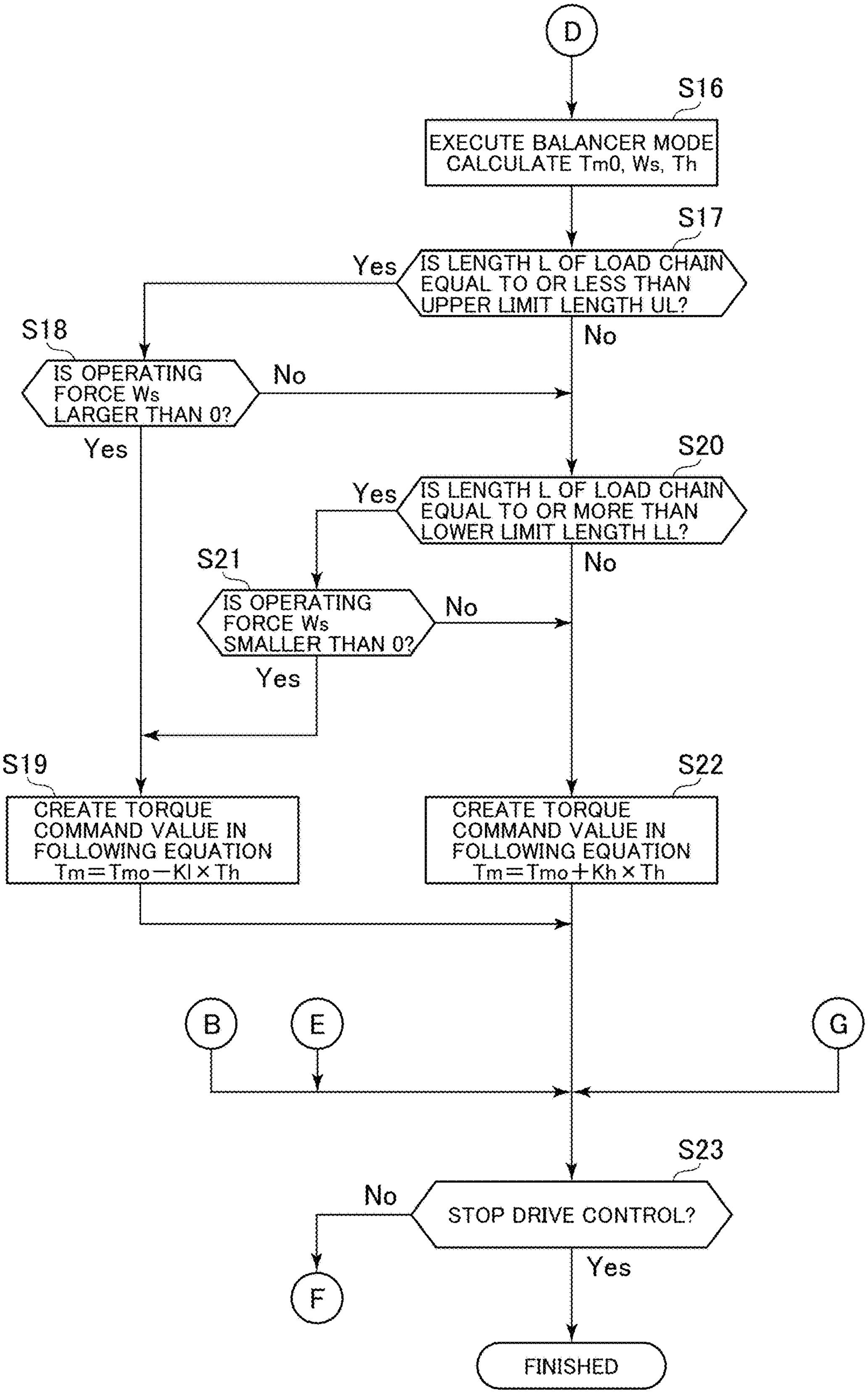
FIG. 6 is a view illustrating a part of the control flow of the winding machine illustrated in FIG. 1, and is a view illustrating Step S16 to Step S23.
Figure 7:
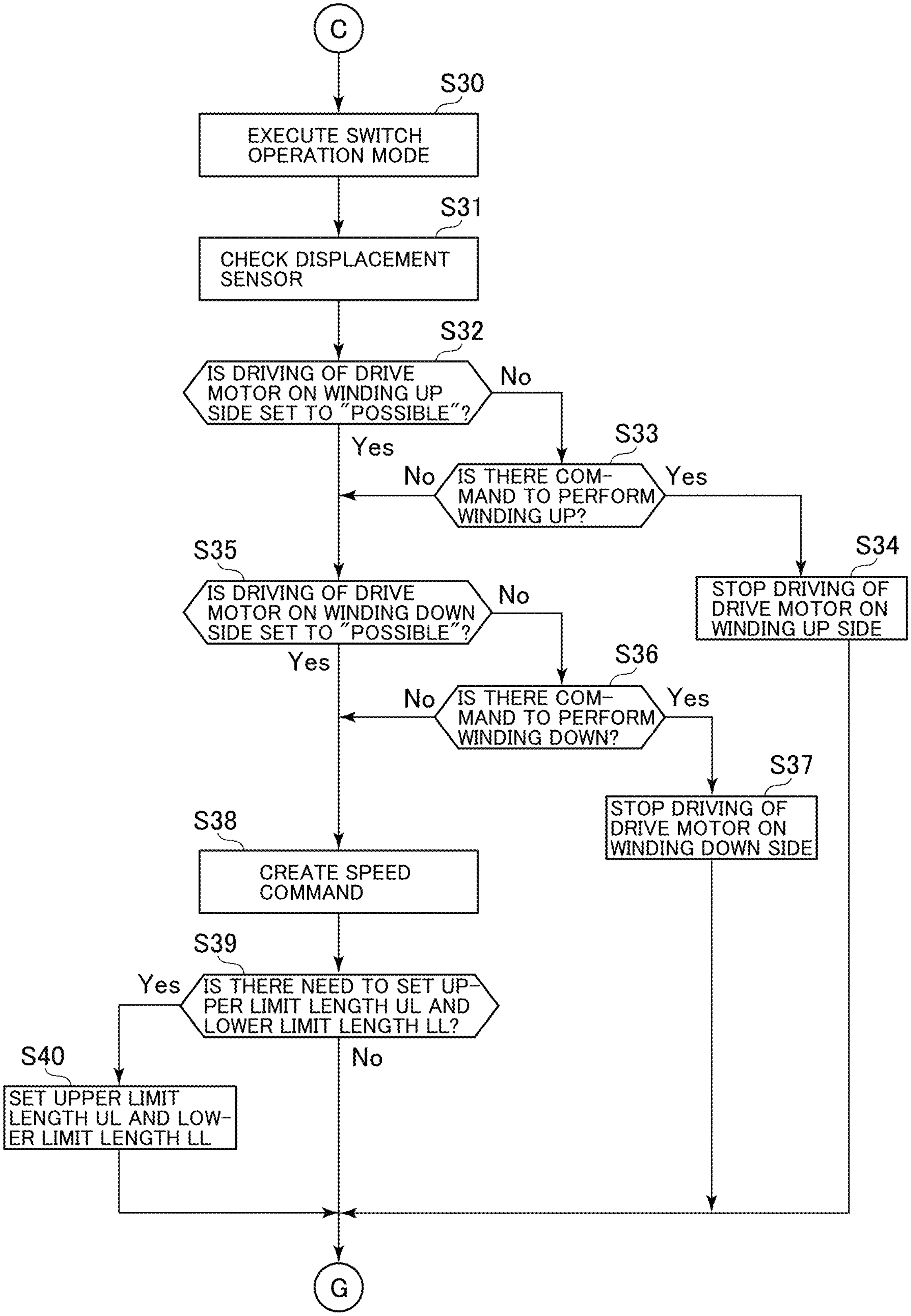
FIG. 7 is a view illustrating a part of the control flow of the winding machine illustrated in FIG. 1, and is a view illustrating Step S30 to Step S40.

Further, the cylindrical operation device 150 is an operation device for an operator to perform operation while holding it by hand, and is connected to the lower end side of the load chain C1. Further, the lower hook 160 for hanging the load P is connected to the cylindrical operation device 150. FIG. 3 is a view illustrating a configuration of the cylindrical operation device 150. As illustrated in FIG. 3, the cylindrical operation device 150 includes an operation mode changeover switch 151, a movable grip 152, and a displacement sensor 153. Incidentally, the operation device is not limited to the operation device connected to the lower hook 160, but may be an operation device (pendant switch) suspended by a cable from the winding machine main body unit, or the like, or may be a wireless remote control device.

The operation mode changeover switch 151 (corresponding to a switching means) is a switch for switching the operation mode of the drive motor 40, and a switch signal of the operation mode changeover switch 151 is output to the control unit 100. In this embodiment, the operation mode includes at least two operation modes: a switch operation mode and a balancer mode. Then, by pressing the operation mode changeover switch 151, the control unit 100 can switch the operation mode of the drive motor 40 to the switch operation mode, the balancer mode, or another mode. The control unit 100 outputs a speed control command or a torque control command to the driver 110 (servo driver) to control the drive motor 40 by the speed control in the switch operation mode or by the torque control in the balancer mode.

Further, the movable grip 152 is a part that is operated when operating in the switch operation mode. This movable grip 152 is provided to be slidable in the up and down direction and held at the neutral position by a biasing means such as a spring, and the movable grip 152 can be made to slide up and down from the neutral position against the biasing means. The displacement sensor 153 outputs a detection signal according to the amount of sliding to the control unit 100. Thereby, the control unit 100 controls the speed of the drive motor 40 based on the above-described detection signal. Incidentally, the cylindrical operation device 150 corresponds to an operation device, and the movable grip 152 corresponds to an operation means and a sliding means.

Further, the chain bucket 170 is a part that stores and holds the (wound-up) load chain C1 on the no-load side, which is present on the side opposite to the lower hook 160 across the load sheave 70.

<2, Regarding a Control Flow of the Drive Motor 40>

Next, there is explained a control flow (drive control) of the drive motor 40 according to this embodiment in the winding machine 10 having the above-described configuration based on FIG. 4 to FIG. 7. Incidentally, the following respective steps are the parts to be executed or determined by the control unit 100.

The control unit 100 determines whether or not the upper-limit limit switch 80 is activated (Step S01). Here, in the case where the upper-limit limit switch 80 is activated, the cylindrical operation device 150, the lower hook 160, and the load P are brought into a state of being raised up to the upper limit position.

Therefore, in the case where it is determined that the upper-limit limit switch 80 is not activated in the determination at Step S01 above (in the case of No), driving of the drive motor 40 in the winding up direction is set to "possible" (written in the predetermined memory 101), as winding up is possible (Step S02). On the other hand, in the case where it is determined that the upper-limit limit switch 80 is activated in the determination at Step S01 (in the case of Yes), driving of the drive motor 40 in the winding up direction is set to "impossible" (written in the predetermined memory 101), as further winding up is impossible (Step S03).

After the processes at Steps S02 and S03, the control unit 100 determines whether or not the lower-limit limit switch 81 is activated (Step S04). Here, in the case where the lower-limit limit switch 81 is activated, the cylindrical operation device 150, the lower hook 160, and the load P are brought into a state of being lowered down to the lower limit position. Thus, in the case where it is determined that the lower-limit limit switch 81 is not activated in the determination at Step S04 (in the case of No), driving of the drive motor 40 in the winding down direction is set to "possible" (written in the predetermined memory 101), as winding down is possible (Step S05). On the other hand, in the case where it is determined that the lower-limit limit switch 81 is activated in the determination at Step S04 (in the case of Yes), driving of the drive motor 40 in the winding down direction is set to "impossible" (written in the predetermined memory 101), as further winding down is impossible (Step S06).

After Steps S05 and S06 described above, the control unit 100 reads the loading load measured by the load sensor 90 (Step S07). At Step S07, the value of the read loading load is subjected to filtering or the like as appropriate to be written in the predetermined memory 101. The filtering may be performed in an amplifier or the like provided in the load sensor 90 without being performed in the control unit 100, or may be performed in both the control unit 100 and the amplifier. Incidentally, Step S07 corresponds to a load torque detection step. Next, the control unit 100 reads positional information output from the driver 110 (servo driver) (Step S08). Incidentally, this positional information is positional information indicating the feeding amount of the load chain C1, which is output by the driver 110, based on the information from the encoder 41 that detects the rotation of the drive motor 40 in order for the driver 110 (servo driver) to control the drive motor 40 in the speed control mode or the torque control mode. The output of the encoder 41 may be directly input to the control unit 100 to calculate the feeding amount of the load chain C1.

The feeding amount corresponds to the lifting and lowering positions, the direction in which the feeding amount increases is the winding down direction, and the direction in which the feeding amount decreases is the winding up direction, and when the feeding amount is large, the lifting/lowering position will be downward, and when the feeding amount is small, the lifting/lowering position will be upward.

Next, the control unit 100 determines whether or not the loading load read at Step S07 is an overload set beforehand (Step S09). In the case where it is determined that the above-described read loading load is not an overload (within a rated load range) in this determination (in the case of No), the operation proceeds to Step S11 to be described later. On the other hand, in the case where it is determined that the above-described read loading load is an overload in the determination at Step S09 (in the case of Yes), an overload (abnormal) process is executed as it is in an overload state (Step S10). Incidentally, the overload (abnormal) process is a process to prohibit driving of the drive motor 40, and is a process for an emergency stop during operation. Further, at the same time, a buzzer, a display, or another means is used to warn or notify that the load is an overload. After the process at Step S10, the operation proceeds to the determination at Step S23 to be described later.

In the case where it is determined that the above-described read loading load is not an overload (within a rated load range) at Step S09 (in the case of No), a check process of the operation mode changeover switch 151 is performed (Step S11). At Step S11, by the signal from the operation mode changeover switch 151, an operation mode memory (the memory 101) is rewritten into the "balancer mode" or the "switch operation mode" by a flip-flop method. After entering a state of performing this check process, the control unit 100 reads the operation mode memory (memory 101) to determine whether or not the operation mode memory is the balancer mode (Step S12). In the case where it is determined that it is the balancer mode in this determination (in the case of Yes), the operation proceeds to the following Step S13. On the other hand, in the case where it is determined that it is not the balancer mode but the switch operation mode in the determination at Step S12 (in the case of No), the operation proceeds to Step S30 to be described later.

In the case where it is determined that it is the balancer mode at Step S12 (in the case of Yes), the control unit 100 refers to setting information at Steps S02 and S03 (the memory 101) to determine whether or not driving of the drive motor 40 in the winding up direction is "possible" (Step S13). In the case where it is determined that driving of the drive motor 40 in the winding up direction is not possible in this determination (in the case of No), the balancer mode (torque control) with winding up and winding down of the drive motor 40 cannot bet executed, and thus a stop process to stop the balancer mode is performed (Step S14). Incidentally, after this stop process, the operation proceeds to Step S23 to be described later (see FIG. 7).

On the other hand, in the case where it is determined that driving of the drive motor 40 in the winding up direction is possible in the determination at Step S13 (in the case of Yes), the control unit 100 refers to the setting information at Steps S05 and S06 (memory 101) to determine whether or not driving of the drive motor 40 in the winding down direction is "possible" (Step S15). In the case where it is determined that driving of the drive motor 40 in the winding down direction is not possible in this determination (in the case of No), the balancer mode (torque control) with winding up and winding down of the drive motor 40 cannot be executed, and thus the stop process at Step S14 is performed. This stop process includes the process of switching the operation mode memory from the "balancer mode" to the "switch operation mode."

In the case where it is determined that driving in the winding down direction is "possible" at Step S15 (in the case of Yes), the control unit 100 outputs a command in the torque control mode to the driver 110 (servo driver) and at the same time, executes (continues) the drive control in the balancer mode (Step S16). In executing this balancer mode, values of a motor torque Tm0, an operating force Ws by the operator, and an increase/decrease motor torque Th as described below are calculated. This calculation is made based on the following equations. Incidentally, the units in the following can be converted as necessary. Incidentally, Step S16 to Step S22 correspond to a torque control step, but other steps relating to the drive control of the drive motor 40 other than these may be included in the torque control step. Further, Step S16 corresponds also to a setting step.

First, a weight of the wound load chain C1 is set to wcm (kg), a unit weight of the load chain C1 is set to wc0 (kg), a fed length of the load chain C1 is set to L (m), and an entire length of the load chain C1 is set to L0 (m). Then, wcm is calculated as follows.

$$wcm=wc0\times(L0-L) \quad \text{(Equation 1)}$$

Further, a weight of the winding machine main body unit 20 is set to wh (kg). Incidentally, this weight wh does not include the weight of the load chain C1. Further, a loading load measured by the load sensor 90 (load cell) is set to W1 (N) and a gravitational acceleration is set to g. Then, using Equation 1, a winding target load w is calculated as follows.

$$w=W1/g-(wh+wcm) \quad \text{(Equation 2)}$$

A value of the loading load of the load sensor 90 to be stored in the memory 101 when the balancer mode starts (set value) is set to W10 (N), and then a winding target set load w0 is calculated as follows. In the setting step, a step of writing the value of the loading load (set value) W10 into the memory at the start of the balancer mode is a set load setting step, and when the signal from the operation mode change-over switch 151 is confirmed at Step S11 described above, namely, before switching to the balancer mode at Step S16, the value of the loading load (set value) W10 may be written into the memory and the set load setting step may be set as the setting step.

$$w0=W10/g-(wh+wcm) \quad \text{(Equation 3)}$$

Here, the winding target set load w0 varies according to the fed length L of the load chain C1 by (Equation 1). Thus, the value of the loading load (set value) W10 may be stored in the memory 101 by dividing it into two portions: (A) the "portion corresponding to the fed length L of the load chain C1" being a varying portion of the load and (B) the remaining portion so as to prevent the winding target set load w0 from varying according to the fed length L of the load chain C1. Incidentally, in the case where the weight of (A) the "portion corresponding to the fed length L of the load chain C1" is negligibly small compared to the winding target load w0, this (A) weight may be ignored.

Here, the force with which the operator lifts or pushes down the load P, the cylindrical operation device 150, or the lower hook 160 is set to an operating force Ws(N). This operating force Ws is calculated as follows.

$$Ws=W10-W1 \quad \text{(Equation 4)}$$

Incidentally, in (Equation 4), the loading load W1 measured by the load sensor 90 becomes smaller (lighter) than the set value W10 as the operator tries to lift the load P, or the like, so that the operating force Ws becomes positive. On the other hand, the loading load W1 measured by the load sensor 90 becomes larger (heavier) than W10 as the operator tries to push down the load P, or the like, so that the operating force Ws becomes negative.

Here, in the balancer mode, the motor torque Tm0 (Nm) of the drive motor 40, which is balanced with the winding target set load w0 (kg), is calculated by the following equation, when a deceleration ratio of the deceleration mechanism 50 is set to i and a working radius of the load sheave 70 is set to r (m). Incidentally, the motor torque Tm0 corresponds to a balanced torque.

$$Tm0=(1/i)\times r\times g\times w0 \quad \text{(Equation 5)}$$

Further, the equation for finding the increase/decrease motor torque Th (Nm) of the drive motor 40 from the operating force Ws is as follows.

$$Th=(1/i)\times r\times Ws \quad \text{(Equation 6)}$$

Figure 8:
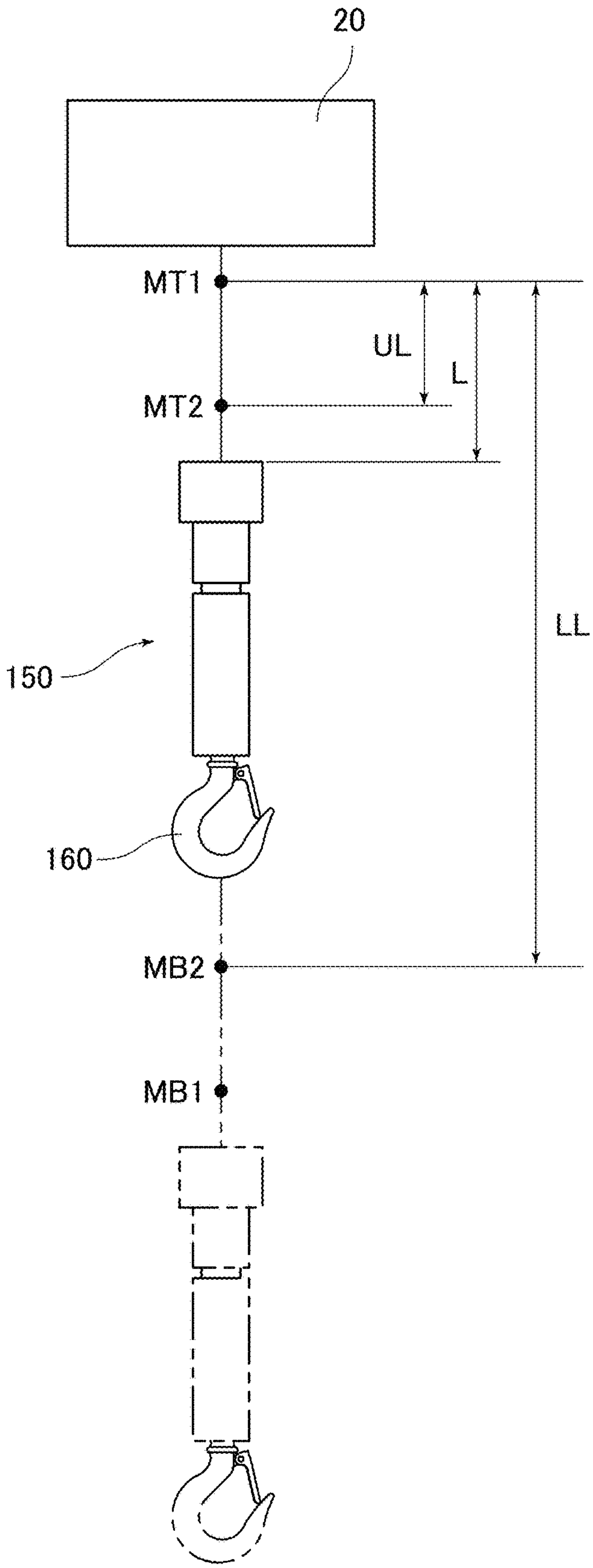
FIG. 8 is a view illustrating an upper limit length and a lower limit length in the winding machine illustrated in FIG. 1.

After finding the motor torque Tm0 balanced with the winding target set load w0 set and registered when the balancer mode starts, the operating force Ws, and the increase/decrease motor torque Th, the control unit 100 determines whether or not the length L of the load chain C1 fed from the load sheave 70 is equal to or less than a balancer upper limit length UL (or equal to or higher than a balancer upper limit position in the lifting/lowering position reference) (Step S17). Here, as for the length L of the load chain C1 fed from the load sheave 70 and the balancer upper limit length UL, as illustrated in FIG. 8, the length (distance) between an upper limit position MT1, where the upper-limit limit switch 80 is activated, and the upper end of the cylindrical operation device 150 is L, and the length (distance) between the upper limit position MT1 and a balancer upper limit position MT2, which is the upper limit position in the balancer mode, is UL. Incidentally, the balancer upper limit position MT2 is a soft upper limit position when the cylindrical operation device 150 (lower hook 160 and load P) are raised. The balancer upper limit position MT2 may be determined by user setting or may be calculated by a predetermined arithmetic expression. In the case where it is determined each time by user setting, it can be set in the switch operation mode to be described later.

In the case where it is determined that the fed length L of the load chain C1 is equal to or less than the balancer upper limit length UL in the determination at Step S17 described above (in the case of Yes), the control unit 100 then determines whether or not the operating force Ws of the operator found by (Equation 4) is larger than 0 (is positive) (Step S18).

That is, as described by (Equation 4) described above, in the case where the operating force Ws is positive, it means that the operator is applying a force to the load P in the direction of lifting the load P (winding up direction). Therefore, in the case where it is determined that the operating force Ws of the operator is larger than 0 (positive) at Step S18, the control unit 100 creates a torque command Tm expressed by the following Equation (7) (Step S19).

$$Tm=Tm0-Kl\times Th \quad \text{(Equation 7)}$$

In this way, it is designed that a lifting/lowering position range of the load P is set to the position range that is equal to or higher than the balancer upper limit position MT2, and it is determined whether or not to control regulation according to the direction of the operating force Ws in this set position range, and in the case where regulation is required, the torque command Tm calculated by Equation (7) is output from the control unit 100 to the driver 110 (servo driver) to torque control the drive motor 40.

Then, the control unit 100 outputs the created torque command Tm to the driver 110, and the driver 110 drives the drive motor 40 with power based on the torque command Tm. Incidentally, the torque command Tm calculated by (Equation 7) corresponds to a second torque command value, and the value of "−Kl×Th" in (Equation 7) corresponds to a cancel torque. Here, as described also in (Equation 4) above, the value of "−Kl×Th" becomes a negative value when the operator applies a force in the direction of lifting the load P, and becomes a positive value when the operator applies a force in the direction of pushing down the load P, and by adding the cancel torque "−Kl×Th" to the motor torque Tm0, which is balanced with the winding target set load w0, the lifting and lowering of the load P can be regulated.

In the above-described equation, Kl is a gain representing an amplification factor, and in the case where the value of the gain Kl is less than mechanical efficiency (η), the value of the motor torque, which corresponds to the torque command in the portion of "−Kl×Th" of the torque command Tm, generated by the drive motor 40 becomes small with respect to the operating force Ws of the operator to be defeated by the operating force Ws, resulting in that position regulation may become insufficient. Therefore, it is preferable and certain that the value of gain Kl should be "1", for example, which is equal to or more than the mechanical efficiency (η).

Incidentally, in (Equation 7), the increase/decrease motor torque Th corresponding to the operating force Ws of the operator is subtracted from the motor torque Tm0 of the drive motor 40 in a balanced state. Therefore, even if the operator tries to lift the load P with the operating force Ws, the drive motor 40 is driven with the torque command Tm in a state where the operating force Ws is cancelled. Therefore, the load P is brought into a state of not moving in the lifting direction even though the operator is trying to lift it.

Incidentally, depending on the specifications of the winding machine 10, the value of "−Kl×Th" may be set to a fixed value to the extent that the operator can recognize that the load P has reached the balancer upper limit position MT2 or a balancer lower limit position MB2, that is, to the extent that the feeling of operation becomes heavy or more at each of the upper limit side and the lower limit side.

Incidentally, after Step S19, the control unit 100 performs the determination at Step S23 to be described later.

Further, in the case where it is determined that the fed length L of the load chain C1 is larger than the upper limit length UL (or is below the balancer upper limit in the lifting/lowering position reference) in the determination at Step S17 (in the case of No), the control unit 100 then determines whether or not the fed length L of the load chain C1 is equal to or more than a balancer lower limit length LL (or equal to or lower than the balancer lower limit in the lifting/lowering position reference) (Step S20). Here, the balancer lower limit length LL is the length (distance) between the upper limit position MT1 where the upper-limit limit switch 80 is activated and the balancer lower limit position MB2 that is the lower limit position of the balancer mode, as illustrated in FIG. 8. Incidentally, the range between the balancer upper limit position MT2 and the balancer lower limit position MB2 corresponds to a first position range and a balancer intermediate position range. Further, the range between the upper limit position MT1 and the balancer upper limit position MT2 and the range between a lower limit position MB1 and the balancer lower limit position MB2 correspond to a second position range.

The above-described balancer lower limit position MB2 is a soft lower limit position when the cylindrical operation device 150 (lower hook 160 and load P) are lowered (the load chain C1 is fed), similar to the balancer upper limit position MT2. The balancer lower limit position MB2 is located above the lower limit position MB1 where the lower-limit limit switch 81 is activated. This balancer lower limit position MB2 may be set by user setting or calculated by a predetermined arithmetic expression. Further, the signal of either the upper-limit limit switch 80 or the lower-limit limit switch 81 is preferably set as a reset signal at the reference position for the fed length of the load chain C1 (lifting/lowering position), but depending on the specifications of the winding machine 10, neither the upper-limit limit switch 80 nor the lower-limit limit switch 81 is an essential component, and only one of the balancer upper limit position MT2 and the balancer lower limit position MB2 may be set.

In the case where it is determined that the fed length L of the load chain C1 is equal to or more than the balancer lower limit length LL (or equal to or lower than the balancer lower limit position in the lifting/lowering position reference) in the determination at Step S20 described above (in the case of Yes), the control unit 100 then determines whether or not the operating force Ws of the operator is smaller than 0 (is negative (Step S21).

In other words, as described in (Equation 4) described above, in the case where the operating force Ws is negative, the operator is applying a force in the direction of pushing down the load. Therefore, in the case where it is determined that the operating force Ws of the operator is smaller than 0 (negative) at Step S21, the control unit 100 proceeds to Step S19 described above. In other words, the torque command Tm illustrated in (Equation 7) is created.

Then, the control unit 100 outputs the created torque command Tm to the driver 110, and the driver 110 drives the drive motor 40 with power based on the torque command Tm.

Incidentally, in the case of pushing down the load, the reference sign of Th is opposite to that in the case of lifting the load. Therefore, when "−Kl×Th" corresponding to the operating force Ws of the operator is added to the motor torque Tm0 of the drive motor 40 in a balanced state in (Equation 7), the drive motor 40 is driven with the torque command Tm in a state where the operating force Ws for pushing down the load is cancelled. Consequently, the load P is brought into a state of not moving in the pushing down direction even though the operator is trying to push down the load (lower the load).

In this way, a position range that is equal to or higher than the balancer upper limit position MT2 and a position range that is equal to or lower than the balancer lower limit position MB2 are each set, or one of these position ranges is set, and the control unit 100 determines whether or not the lifting/lowering position range of the load P is present in this set position range at Step S17 and Step S20 (corresponding to a lifting/lowering position range confirmation step). Then, the control unit 100 determines whether or not to control regulation in this set position range according to the direction of the operating force Ws at Step S18 and Step S21, and in the case where regulation is required, the torque command Tm calculated by (Equation 7) at Step S19 is output from the control unit 100 to the driver 110 (servo driver) to torque control the drive motor 40 (corresponding to first and second balancer mode selection steps).

Further, depending on the specifications of the winding machine 10, the value of "−Kl×Th" may be set to a fixed value to the extent that the operator can recognize that the load P has reached the balancer upper limit position MT2 or the balancer lower limit position MB2, that is, to the extent that the feeling of operation becomes heavy at each of the upper limit side and the lower limit side.

Further, in the case where it is determined that the fed length L of the load chain C1 is smaller than the balancer lower limit length LL (or is above the balancer lower limit position MB2 in the lifting/lowering position reference) in the determination at Step S20 described above (in the case of No), the control unit 100 creates such a torque command Tm as described in the following (Equation 8) to transmit it to the driver 110 (Step S22). Incidentally, the torque command Tm in (Equation 8) below corresponds to a first torque command value. Further, Step S22 corresponds to a balance control step.

$$Tm = Tm0 + Kh \times Th \quad \text{(Equation 8)}$$

Incidentally, also in the case where it is determined that the operating force Ws is 0 or more (or is 0 or a positive value) in the determination at Step S21 described above (in the case of No), the process at Step S22 described above is executed. Further, in (Equation 8) described above, "Kh×Th" corresponds to an assist torque.

Further, in the above-described equation, Kh is a gain representing the amplification factor and is found experimentally, considering the mechanical efficiency, acceleration, and the like of the drive motor 40, and the like. This gain Kh is set to a value sufficiently larger than 1, and for example, the gain Kh is set so that the ratio of the value of Kh×Th to Tm0 becomes about 5 to 20%, in order to improve the operability in the balancer mode. Incidentally, Kh at the time of winding up and Kh at the time of winding down may be different values, and for example, winding up Khu may be made smaller than winding down Khd.

As is clear from (Equation 8) described above, the control unit 100 adds the assist torque "Kh×Th" obtained by multiplying the motor torque Th corresponding to the operating force Ws by the predetermined gain Kh to the motor torque Tm0 of the drive motor 40 balanced with the winding target set load w0 and calculates the torque command Tm. Therefore, the load P can be moved in the up and down direction with a light force.

In this way, as for the torque command Tm, it is designed that when assisting, the torque command Tm is output from the control unit 100 to the driver 110 in a first balancer mode calculated by (Equation 8) or (Equation 9) to be described later, and when not assisting, the torque command Tm is output from the control unit 100 to the driver 110 in a second balancer mode calculated by (Equation 7). Further, it is designed so that the lifting/lowering position range where control is performed in the first balancer mode and the second balancer mode can be set and registered, and thus, it becomes possible to regulate the directions of winding up and winding down at the balancer upper limit position MT2 and/or the balancer lower limit position MB2 without interrupting the torque control of the drive motor 40.

Then, after executing the processes at Step S14, Step S22, and Step S19 described above, the control unit 100 determines whether or not to stop the drive control of the drive motor 40 consisting of the balancer mode and the switch operation mode by receiving an abnormal signal or a not-illustrated command (Step S23). In the case where it is determined to stop the drive control in this determination (in the case of Yes), the operation proceeds to a process in a not-illustrated maintenance mode or the like, for example, based on a command or the like, and at the same time, this program being the drive control is finished. On the other hand, in the case where it is determined not to stop (to continue) this drive control in the determination at Step S23 (in the case of No), the operation returns to the determination at Step S01 described above to continue the drive control.

Next, the switch operation mode is explained. In the case where it is determined that it is not the balancer mode at Step S12 described above (in the case of No), the switch operation mode is executed (continued) (Step S30). In other words, an execution program of the switch operation mode is read from the memory 101, and the command of the speed control mode is output to the driver 110 (servo driver).

Then, the control unit 100 checks the displacement sensor 153 included in the cylindrical operation device 150 (Step S31). In other words, at which position the movable grip 152 is located is checked by the displacement sensor 153. Then, a winding up and winding down set state based on a slid position of the movable grip 152 is made.

Then, referring to the setting information at Steps S02 and S03 (memory 101), the control unit 100 determines whether or not driving of the drive motor 40 in the winding up direction is "possible" (Step S32). That is, the determination similar to that at Step S13 is performed. In the case where it is determined that driving of the drive motor 40 in the winding up direction is not possible in the determination at Step S32 (in the case of No), the control unit 100 determines whether or not there is a command to perform winding up (Step S33). In other words, it is determined from the result of checking whether or not the movable grip 152 at Step 31 has been slid in the winding up direction (memory 101).

Here, it has already been determined to be "impossible" at Step S32, which means that driving of the drive motor 40 on the winding up side is not performed. Therefore, in the case where it is determined that there is a command to perform winding up in the determination at Step S33 described above (in the case of Yes), a process to stop driving of the drive motor 40 in the winding up direction and a process to activate the brake mechanism 60 are then performed (Step S34).

On the other hand, in the case where it is determined that driving of the drive motor 40 in the winding up direction is possible at Step S32 described above (in the case of Yes) and in the case where it is determined that there is no command to perform winding up at Step S33 (in the case of No), referring to the setting information at Step S05 and Step S06 (memory 101), the control unit 100 then determines whether or not driving of the drive motor 40 in the winding up direction is "possible" (Step S35). In other words, the same determination as that at Step S15 is performed. In the case where it is determined that driving of the drive motor 40 in the winding up direction is not possible, which is "impossible," in the determination at Step S35 (in the case of No), the control unit 100 determines whether or not there is a command to perform winding up (Step S36). In other words, it is determined from the result of determination whether or not the movable grip 152 has been slid in the winding up direction at Step 31 (memory 101).

Here, it has already been determined to be "impossible" at Step S35, which means that driving of the drive motor 40 on the winding up side is not possible. Therefore, in the case where it is determined that there is a command to perform winding up in the determination at Step S36 described above (in the case of Yes), a process to stop driving of the drive motor 40 in the winding up direction and a process to activate the brake mechanism 60 are then performed (Step S37).

On the other hand, in the case where it is determined that driving of the drive motor 40 in the winding up direction is possible at Step S35 described above (in the case of Yes), the control unit 100 creates a speed command to output it to the driver 110 (Step S38). This speed command is created based on the value of the memory 101 that has stored a detection signal from the displacement sensor 153 that detects the slid position of the movable grip 152 at Step S31.

Then, regarding a driving range of the drive motor 40, it is determined whether or not there is a need (request) to set the upper limit length UL and the lower limit length LL illustrated in FIG. 8 (Step S39). In other words, depending on the operation environment of the cylindrical operation device 150, it may be preferable to change the setting of the soft upper limit position and lower limit position. Thus, at Step S39, whether or not to set the upper limit length UL and the lower limit length LL (there is a request to reset) is determined by the length of an ON signal from a changeover switch, for example.

In the case where it is determined that there is a need to set the upper limit length UL and the lower limit length LL in the determination at Step S39 described above (in the case of Yes), the upper limit length UL and the lower limit length LL are set (Step S40). In other words, a working range of the cylindrical operation device 150 is determined in a software manner. Incidentally, after the process at Step S40, the control unit 100 determines whether or not to stop (continue) the drive control of the drive motor 40 as explained at Step S23 described above.

Further, also in the case where it is determined that there is no need to set the upper limit length UL and the lower limit length LL in the determination at Step S39 (in the case of No), the control unit 100 determines whether or not to stop (continue) the drive control of the drive motor 40 as explained at Step S23 described above.

The above control flow is executed when driving the drive motor 40 in the winding machine 10.

<3. Regarding the Effects>

As above, in the winding machine 10 that lifts and lowers the load P by winding up and winding down the load chain C1 from the winding machine main body unit 20 and the method of controlling the winding machine 10, there are included the load sheave 70 that is arranged in the winding machine main body unit 20, on which the load chain C1 is hung, and that winds up and winds down the load chain C1 according to its rotation, the drive motor 40 that is arranged in the winding machine main body unit 20 and generates a driving force to rotate the load sheave 70, the motor control means (control unit 100 and driver 110) that is arranged in the winding machine main body unit 20 and controls driving of the drive motor 40, and the load detection means (load sensor 90 and a part of control unit 100) that detects the load torque applied to the load sheave 70 by the load chain C1 that hangs the load P and the operating force with which the operator operates the load in the winding up and winding down directions. Then, the motor control means (control unit 100 and driver 110) can control driving of the drive motor 40 in the balancer mode in which the torque control is performed based on the load torque detected by the load detection means (load sensor 90 and a part of control unit 100), and the balancer mode includes the first balancer mode in which driving of the drive motor 40 is controlled based on the first torque command value with the assist torque (Kh× Th) that assists the operating force Ws added thereto (torque command value (Tm) calculated by (Equation 8) described above) and the second balancer mode in which the drive motor 40 is controlled based on the second torque command value that does not assist the operating force Ws (torque command value (Tm) calculated by (Equation 7) described above), and the lifting/lowering position range is set to the first position range where control is performed in the first balancer mode regardless of the direction of the operating force Ws being in either the winding up direction or the winding down direction and the second position range where control is performed to select whether control is performed in the first balancer mode or in the second balancer mode, according to the direction of the operating force Ws.

Therefore, by the torque control to the drive motor 40, it becomes possible to maintain a balanced state and perform an assist according to the operating force in the balancer mode. In addition, even when the drive motor 40 is controlled in the balancer mode in which the torque control is performed, it becomes possible to regulate the winding up and winding down according to the lifting/lowering position without interrupting the torque control.

Further, in the torque control of the drive motor 40, the first torque command value is calculated based on (Equation 8) in the balance position range. Therefore, within the balance position range of the load P, the control is performed only with the first torque command value regardless of the position of the load P, resulting in that the control is not complicated. Further, such torque control based on the first torque command value makes it possible to optimally maintain the balanced state regardless of the position of the load P other than the balancer upper limit position MT2 and the balancer lower limit position MB2.

Further, at the balancer upper limit position MT2 and the balancer lower limit position MB2, the second torque command value is calculated based on (Equation 7). Therefore, even at the balancer upper limit position MT2 and the balancer lower limit position MB2, the drive motor 40 is driven based on the torque command value containing a torque component in the direction of cancelling the operating force Ws, and thus the control command of the drive motor 40 is not complicated. Further, when the drive motor 40 stops at the balancer upper limit position MT2 and the balancer lower limit position MB2, a force that is equal to or more than the torque command value is not applied, and thus, it becomes possible to prevent an extra impact from being applied to structural parts such as the winding machine main body unit 20.

Further, in this embodiment, the first position range is set to the balance position range (balancer intermediate position) between the balancer upper limit position MT2 and the balancer lower limit position MB2 in the balancer mode, and the second position range can be set to the position range that is equal to or higher than the balancer upper limit position MT2 and/or the position range that is equal to or lower than the balancer lower limit position MB2. This enables a winding down operation in the range that is equal to or higher than the balancer upper limit position MT2 by means of the torque command Tm with the assist torque added thereto only in the case where the direction of the operating force Ws is the winding down direction, and enables a winding up operation in the range that is equal to or lower than the balancer lower limit position MB2 by means of the torque command Tm with the assist torque added thereto only in the case where the direction of the operating force Ws is the winding up direction. Accordingly, in each of the cases, the winding up operation and the winding down operation are each regulated when the operating force Ws is in the opposite direction, thus enabling control to regulate the balancer upper limit and the balancer lower limit without interruption even in the torque control. Incidentally, it is possible to make the control to regulate the balancer upper limit and the balancer lower limit valid in the case of the control to regulate both the balancer upper limit and the balancer lower limit, but it is also possible to perform the control to regulate one of them, for example, only the balancer upper limit.

Further, in this embodiment, it is possible to perform a control in which the load torque (Tm0) applied to the winding means (load sheave 70) is set and registered based on the load of the winding up target (g×w) to be raised by the winding means (load sheave 70), the first torque command value Tm in the first balancer mode is set to the torque command (Tm) obtained by adding the assist torque (Kh×

Th) that assists the operating force to the set and registered load torque, and the second torque command value in the second balancer mode is set to the torque command value with the cancel torque (−Kl×Th) that cancels the operating force Ws from the set and registered load torque (Tm0) added thereto.

Therefore, in the balancer mode, it becomes possible to maintain a balanced state and perform an assist according to the operating force. Further, even when the drive motor 40 is controlled in the balancer mode in which the torque control is performed, it becomes possible to regulate the winding up and winding down according to the lifting/lowering position without interrupting the torque control.

Further, in this embodiment, the motor control means (control unit 100 and driver 110) can set the balancer upper limit position MT2 and the balancer lower limit position MB2 to arbitrary height positions. Therefore, the balance position range can be set to an appropriate range according to the environment in which the operator uses the winding machine 10, so that, for example, the load P is not raised too far beyond the operator's reach, or the load P is not lowered to a range where the load P cannot be lifted unless the operator takes a bent posture. Therefore, the efficiency of the work can be improved.

Further, in this embodiment, the winding machine 10 includes the operation device (cylindrical operation device 150), and the cylindrical operation device 150 includes the operation mode changeover switch 151 and the operation means (movable grip 152) and drives the drive motor 40 according to the operation of the operation means (movable grip 152). Further, the motor control means (control unit 100 and driver 110) can switch between the balancer mode and the switch operation mode according to the switch operation of the operation mode changeover switch 151. Further, in the switch operation mode, the motor control means (control unit 100 and driver 110) controls the drive motor 40 based on the operation of the operation means (movable grip 152).

Therefore, by the switch operation of the operation mode changeover switch 151, the operation mode of the drive motor 40 can be switched between the balancer mode and the switch operation mode. In other words, since the operator can switch driving of the drive motor 40 to an appropriate operation mode according to the work content, it becomes possible to improve the workability. Incidentally, when switched to the switch operation mode, the load P can be lifted or lowered to a desired position by the operation of the operation means (movable grip 152).

Further, in this embodiment, the drive motor 40 is a servo motor including the encoder 41, and the motor control means includes the control unit 100 that outputs a command value relating to control and the servo driver 110 that supplies power controlled based on the command value to the drive motor 40. Further, the operation means includes the sliding means (movable grip 152) that slides within a slidable slide range, and the motor control means (control unit 100 and servo driver 110) performs the speed control to control the speed of the drive motor 40 according to the sliding amount of the sliding means (movable grip 152).

Therefore, according to the sliding amount of the sliding means (movable grip 152), the drive motor 40 can be adjusted to an appropriate drive speed. This makes it possible to improve the workability in lifting and lowering the load P.

Modified Example

Hitherto, the embodiment of the present invention has been explained, but besides this, various modifications can be made in the present invention. The following describes these.

In the above-described embodiment, in each of the equations from (Equation 1) to (Equation 8), correction of each calculated value may be made as necessary. For example, heat is generated when the drive motor 40 is used, and the characteristics of magnets and coil conductors that form the motor change with temperature. Thus, it is also possible to make a predetermined correction to each of the above equations (Equation 1) to (Equation 8), taking into account these changes in characteristics due to temperature.

Further, in the above-described embodiment, the control unit 100 finds the motor torque Tm0 of the drive motor 40 that is balanced with the winding target set load w0 based on (Equation 5). Incidentally, as described above, the winding target set load w0 is a value calculated from the load (load) W10 of the load sensor 90 to be stored in the memory 101 when the balancer mode starts, as explained in (Equation 3). However, it is also possible to find the motor torque Tm0 by the winding target load w calculated from the load (load) W1 measured by the load sensor 90 not at the start of the balancer mode, but at a predetermined measurement timing including the present time, for example.

When the winding target load w is used, the equation for finding the motor torque Tm0 is as follows.

$$Tm0=(1/i)\times r\times g\times w \quad \text{(Equation 9)}$$

The motor torque Tm0 calculated by (Equation 9) may be substituted into (Equation 7) and (Equation 8) described above to calculate the torque command Tm.

Further, in the above-described embodiment, the control unit 100 controls driving of the drive motor 40 at the balancer upper limit position MT2 and the balancer lower limit position MB2 based on (Equation 7). However, since the motor torque Tm0 calculated by (Equation 9) based on the winding target load w is balanced including the operating force Ws, the gain Kl may be set to 0 in (Equation 7). Even when the gain Kl is set to 0 as above, lifting and lowering of the load P can be stopped due to the relationship of mechanical efficiency (transmission efficiency).

Further, in (Equation 8) described above, the torque command Tm is calculated by adding the assist torque "Kh×Th" to the motor torque Tm0, but the torque command Tm may be calculated (Equation 10) so that the torque command increases and decreases in proportion to the operating force Ws and the motor torque Tm0.

$$Tm=khr\times Ws\times Tm0 \quad \text{(Equation 10)}$$

The torque command Tm in (Equation 10) is the resultant of adding the motor torque "(Khr×Ws−1)×Tm0" to the motor torque Tm0, and the motor torque "(Khr×Ws−1)×Tm0" corresponds to the assist torque. Khr is a gain representing the amplification factor and is a coefficient determined beforehand according to the specifications of the winding machine.

By calculating the torque command Tm using (Equation 10), regardless of the size of the load of the load P, the load P can be lifted and lowered with an acceleration proportional to the operating force Ws, within the range allowed by the specifications of the drive motor 40. The drive control in the balancer mode may be performed by selecting (Equation 8) or (Equation 10) or combining (Equation 8) and (Equation 10) according to the work contents of lifting and lowering the load P or the load of the load P. Incidentally, the maximum rotation speed (winding up speed) of the drive motor 40 is set and registered to a predetermined value beforehand. The gain Khr may be set to different values for winding up and winding down in the same manner as the gain Kh, may be increased or decreased depending on the size of the load of the load P, and may be set according to the working environment in which the winding machine is used, by reducing the growth of acceleration when the load is a predetermined value or more, for example.

The invention claimed is:

1. A winding machine being a winding machine that lifts and lowers a load by winding up and winding down a load chain or a rope from a winding machine main body, the winding machine comprising:

a winder that is arranged in the winding machine main body, on which the load chain or the rope is hung, and that winds up and winds down the load chain or the rope according to rotation;

a drive motor that generates a driving force to rotate the winder;

a motor controller that controls driving of the drive motor; and a load detector that detects a load torque applied to the winder by the load chain or the rope hanging the load and an operating force with which an operator operates the load in winding up and winding down directions, wherein the motor controller is able to control driving of the drive motor in a balancer mode in which a torque control is performed based on the load torque, and the balancer mode includes:

a first balancer mode in which driving of the drive motor is controlled based on a first torque command value with an assist torque that assists the operating force added thereto, and a second balancer mode in which driving of the drive motor is controlled based on a second torque command value that does not assist the operating force, and a lifting/lowering position range is set to a first position range where control is performed in the first balancer mode regardless of the direction of the operating force being in either the winding up or winding down direction, and a second position range where control is performed to select whether control is performed in the first balancer mode or in the second balancer mode, according to the direction of the operating force being in the winding up or winding down direction.

2. The winding machine according to claim 1, wherein the first position range is set to a balance position range between a balancer upper limit position and a balancer lower limit position in the balancer mode, and the second position range is set to a position range that is equal to or higher than the balancer upper limit position and/or a position range that is equal to or lower than the balancer lower limit position.

3. The winding machine according to claim 2, wherein the motor controller is able to set the balancer upper limit position and the balancer lower limit position to arbitrary height positions.

4. The winding machine according to claim 2, wherein a load torque applied to the winder is set and registered based on a load of a winding target to be raised by the winder, and the first torque command value in the first balancer mode is set to a torque command value obtained by adding an assist torque that assists the operating force to the set and registered load torque, and the second torque command value in the second balancer mode is set to a torque command value with a cancel torque that cancels the operating force from the set and registered load torque added thereto.

5. The winding machine according to claim 2, further comprising:

an operation device that includes an operation mode changeover switch and an operator and drives the drive motor according to an operation of the operator, wherein the motor controller is able to switch between the balancer mode and a switch operation mode according to a switch operation of the operation mode changeover switch, and in the switch operation mode, the motor controller controls driving of the drive motor based on an operation of the operator.

6. The winding machine according to claim 5, wherein the drive motor is a servo motor including an encoder, the motor controller includes a controller that outputs a command value relating to control and a servo driver that supplies power controlled based on the command value to the drive motor, the operator includes a slider that slides within a slidable slide range, and the motor controller performs a speed control to control the speed of the drive motor according to a sliding amount of the slider.

7. The winding machine according to claim 4, further comprising:

an operation device that includes an operation mode changeover switch and an operator and drives the drive motor according to an operation of the operator, wherein the motor controller is able to switch between the balancer mode and a switch operation mode according to a switch operation of the operation mode changeover switch, and in the switch operation mode, the motor controller controls driving of the drive motor based on an operation of the operator.

8. The winding machine according to claim 7, wherein the drive motor is a servo motor including an encoder, the motor controller includes a controller that outputs a command value relating to control and a servo driver that supplies power controlled based on the command value to the drive motor, the operator includes a slider that slides within a slidable slide range, and the motor controller performs a speed control to control the speed of the drive motor according to a sliding amount of the slider.

9. The winding machine according to claim 3, further comprising:

an operation device that includes an operation mode changeover switch and an operator and drives the drive motor according to an operation of the operator, wherein the motor controller is able to switch between the balancer mode and a switch operation mode according to a switch operation of the operation mode changeover switch, and in the switch operation mode, the motor controller controls driving of the drive motor based on an operation of the operator.

10. The winding machine according to claim 9, wherein the drive motor is a servo motor including an encoder, the motor controller includes a controller that outputs a command value relating to control and a servo driver that supplies power controlled based on the command value to the drive motor, the operator includes a slider that slides within a slidable slide range, and the motor controller performs a speed control to control the speed of the drive motor according to a sliding amount of the slider.

11. The winding machine according to claim 1, wherein a load torque applied to the winder is set and registered based on a load of a winding target to be raised by the winder, and the first torque command value in the first balancer mode is set to a torque command value obtained by adding an assist torque that assists the operating force to the set and registered load torque, and the second torque command value in the second balancer mode is set to a torque command value with a cancel torque that cancels the operating force from the set and registered load torque added thereto.

12. The winding machine according to claim 11, further comprising:

an operation device that includes an operation mode changeover switch and an operator and drives the drive motor according to an operation of the operator, wherein the motor controller is able to switch between the balancer mode and a switch operation mode according to a switch operation of the operation mode changeover switch, and in the switch operation mode, the motor controller controls driving of the drive motor based on an operation of the operator.

13. The winding machine according to claim 12, wherein the drive motor is a servo motor including an encoder, the motor controller includes a controller that outputs a command value relating to control and a servo driver that supplies power controlled based on the command value to the drive motor, the operator includes a slider that slides within a slidable slide range, and the motor controller performs a speed control to control the speed of the drive motor according to a sliding amount of the slider.

14. The winding machine according to claim 1, further comprising:

an operation device that includes an operation mode changeover switch and an operator and drives the drive motor according to an operation of the operator, wherein the motor controller is able to switch between the balancer mode and a switch operation mode according to a switch operation of the operation mode changeover switch, and in the switch operation mode, the motor controller controls driving of the drive motor based on an operation of the operator.

15. The winding machine according to claim 11, wherein the drive motor is a servo motor including an encoder, the motor controller includes a controller that outputs a command value relating to control and a servo driver that supplies power controlled based on the command value to the drive motor, the operator includes a slider that slides within a slidable slide range, and the motor controller performs a speed control to control the speed of the drive motor according to a sliding amount of the slider.

16. A method of controlling driving of a winding machine being a method of controlling driving of a winding machine that lifts and lowers a load by winding up and winding down a load chain or a rope from a winding machine main body, wherein the winding machine includes:

a winder that is arranged in the winding machine main body, on which the load chain or the rope is hung, and that winds up and winds down the load chain or the rope according to rotation;

a drive motor that generates a driving force to rotate the winder;

a motor controller that controls driving of the drive motor;

a load detector that detects a load torque applied to the winder by the load chain or the rope hanging the load and an operating force with which an operator operates the load in winding up and winding down directions; and an operation device that includes a switch and drives the drive motor according to a switch operation of the winder, the method comprising:

a load torque detection step that detects a load torque by the load detection means; and a torque control step that controls driving of the drive motor by the motor controller in a lifting/lowering position range set beforehand based on the load torque detected in the load torque detection step, wherein in the torque control step, driving of the drive motor is able to be controlled in a balancer mode in which a torque control is performed based on the load torque, and the balancer mode includes:

a first balancer mode in which driving of the drive motor is controlled based on a first torque command value with an assist torque that assists the operating force added thereto, and a second balancer mode in which driving of the drive motor is controlled based on a second torque command value that does not assist the operating force, and the lifting/lowering position range includes:

a first position range where control is performed in the first balancer mode regardless of the direction of the operating force being in either the winding up or winding down direction, and a second position range where control is performed to select whether control is performed in the first balancer mode or in the second balancer mode, according to the direction of the operating force being in the winding up or winding down direction.

* * * * *